(12) United States Patent
Gierling

(10) Patent No.: US 6,267,212 B1
(45) Date of Patent: *Jul. 31, 2001

(54) AUTOMATIC CONTROLLED TRANSMISSION

(75) Inventor: Armin Gierling, Langenargen (DE)

(73) Assignee: ZF Batavia, L.L.C., Batavia, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/426,514

(22) Filed: Oct. 26, 1999

(30) Foreign Application Priority Data

Nov. 7, 1998 (DE) .............................. 198 51 384

(51) Int. Cl.$^7$ .................................................. F16H 45/02
(52) U.S. Cl. ........................................ 192/3.29; 192/82 T
(58) Field of Search .................. 192/3.28, 3.29, 192/3.3, 82 T

(56) References Cited

U.S. PATENT DOCUMENTS

| 4,423,803 | 1/1984 | Malloy | 192/3.29 |
|---|---|---|---|
| 5,310,033 | * 5/1994 | Shibayama | 192/3.29 |
| 5,779,012 | * 7/1998 | Middelmann et al. | 192/3.3 |
| 6,062,358 | * 5/2000 | Otto et al. | 192/3.29 |

FOREIGN PATENT DOCUMENTS

| 44 20 959 A1 | 1/1995 | (DE) . |
|---|---|---|
| 195 03 295 A1 | 10/1995 | (DE) . |

* cited by examiner

Primary Examiner—Richard M. Lorence
(74) Attorney, Agent, or Firm—Davis & Bujold, P.L.L.C.

(57) ABSTRACT

The invention concerns an automatic controlled transmission having a hydrodynamic converter (1) and a lock-up clutch (10) between an input shaft (7) and an output shaft (8) of the converter (1) wherein the lock-up clutch (10) is actuated by the differential pressure between an intake (14) and return flow (15) of the converter (1) and traversed by a coolant current. It is proposed that the coolant flow be controlled depending on the temperature of the oil. Thereby the transmitting capacity of the lock-up clutch (10) when engaged state is not impaired even when for cooling a larger coolant flow rate through the converter (1) is provided.

11 Claims, 1 Drawing Sheet it is convenient that they be situated as close as
AUTOMATIC CONTROLLED TRANSMISSION

BACKGROUND OF THE INVENTION

The invention concerns an automatic controlled transmission.

Automatic controlled transmissions are being increasingly used in motor vehicles. They can be transmissions with continuously variable ratio or multi-step transmissions shiftable under load or with traction interruption. To make those transmissions more comfortable when starting up and changing the ratio to lower ratio steps, a hydrodynamic converter is manually provided. On account of the low efficiency of the converter, therewith is provided a lock-up clutch which, in operation ranges, is engaged when the converter is no longer needed. In an engaged state, the lock-up clutch transmits the power from an input shaft of the converter to an output shaft.

The lock-up clutch is also used to damp out drive train vibrations that appear when driving through or during operation of critical rotational speeds. The clutch is then slightly opened and adjusted to a slip value of up to 3% depending on rotational speed, the load, and torsional vibrations.

The slip of the lock-up clutch causes an increase in oil temperature dependent on the differential rotational speed and requires an accordingly increased flow rate of the coolant through the converter. In known transmissions, a sufficient flow rate of coolant, is ensured by the friction surfaces of the lock-up clutch being grooved or providing a nozzle system in the piston of the clutch. Although the increased flow rate of coolant in the slip operation has a favorable effect on the temperature of the lock-up clutch and of the converter, the steps already known reduce the transmitting capacity of the lock-up clutch closed. In part, this disadvantage can be compensated by an elevated differential pressure on the piston of the lock-up clutch by increasing the pressure in the converter. Also the loss of pressure on the lock-up clutch has to be compensated by the high flow rate of the coolant. Narrow limits are, of course, set on the pressure increase, especially in the case of heavy engines, since the structural parts cannot be dimensioned as large as desired.

The problem, on which the invention is based, is to improve the cooling of a lock-up clutch of a converter in the slip operation without impairing the transmitting capacity of the lock-up clutch in engaged state.

SUMMARY OF THE INVENTION

According to the invention, the coolant flow through the converter is controlled in accordance with the temperature of the oil. When the lock-up clutch is engaged, the yield of heat is very small; the coolant current can be reduced while in the slip operation in which the transmitting capacity pays a lesser part and a higher coolant current is produced.

One or more bypasses, controlled by a temperature-dependent control valve, are advantageously provided within the friction surfaces of the lock-up clutch. Temperature-dependent apertures or nozzles can also be provided instead of a control valve. The control valves, apertures or nozzles contain temperature dependent, control elements, such as made of bimetal or memorious metal, which immediately react to the temperature of the oil in their environment and with increasing temperature control the bypass. Therefore, the control valve, the aperture and/or the nozzles are conveniently situated in the proximity of the friction surfaces of the lock-up valve. Dependent upon the temperature or the slip, a possible temperature-dependent or slip-dependent external control of the control valve, the aperture and/or the nozzle is not necessary.

BRIEF DESCRIPTION OF THE DRAWINGS

Other advantages result from the description of the drawing that follows. Embodiments of the invention are shown in the drawing. The description and the claims contain numerous features in combination. The expert will conveniently regard the features separately and make logical added combinations. The drawing shows:

DESCRIPTION OF THE PREFERRED EMBODIMENT

Figure 1:
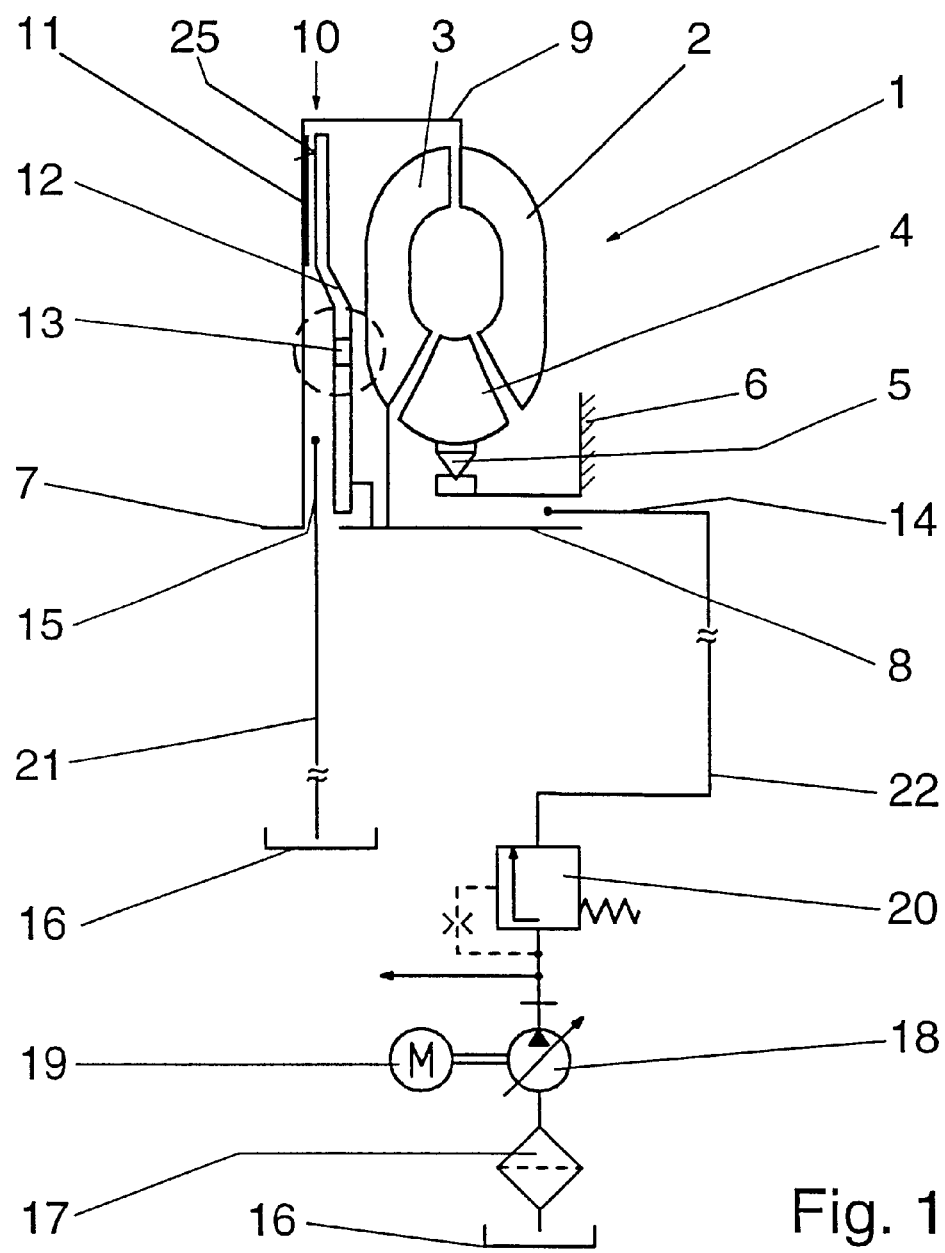
FIG. 1 is a diagrammatic representation of a converter and partly an oil circuit.

A hydrodynamic converter 1 has an impeller 2 connected with an input shaft 7 via a pump housing 9. The impeller 2 conveys oil to the circuit via a stator 4 to a turbine wheel 3. The latter drives an output shaft 8. The stator 4 supports itself on the housing 6 via a free wheel 5.

The converter 1 has a lock-up clutch 10 which, in an engaged state, drivingly bridges the converter 1 and connects the input shaft 7 with the output shaft 8. The lock-up clutch 10 essentially consists of one piston 12 which is connected with the output shaft 8 and has in the outer peripheral area a friction surface 25. The latter interacts with a friction lining 11 applied to a counter surface of the pump housing 9. The piston 12 is axially movable depending on the differential pressure between the pressure on the input side and the return flow 15 of the turbine wheel 3. The pressure on the input side of the turbine wheel 3 substantially corresponds to the pressure of the intake 14. The flow rate of the oil through the converter 1 and the lock-up clutch 10 serves to cool the oil in the converter and the structural parts. A regulatable pump 18 of an oil supply system, only partly shown in FIG. 1, ensures the flow rate. A motor 19 drives the pump 18 which sucks oil from an oil sump 16, via an oil filter 17, and conveys the oil to the intake 14, via a pressure-regulating valve 20 and a pipe 22. According to the pressure ratios on the lock-up clutch 10, a predetermined amount of the oil flows back as coolant flow, via the return flow 15 and a pipe 21 to the oil sump 16.

Figure 2:
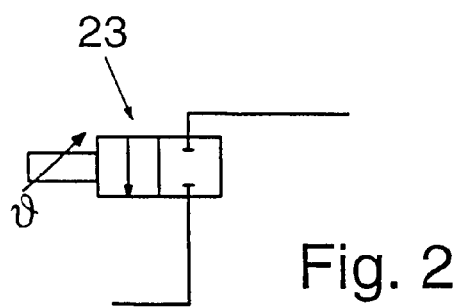
FIG. 2 is a detail with a control valve according to the line 11.
Figure 3:
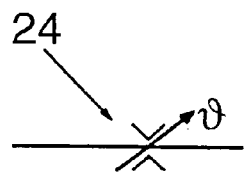
FIG. 3 is a variation of FIG. 2 with one aperture.

If the lock-up clutch 10 is adjusted to slip, an increased heat is produced in the area of the friction surface 25 and of the friction lining 11. To compensate the resulting great heat by a large coolant current through the converter 1, the piston 12 has a bypass 13 controlled in accordance with the temperature. Several bypasses 13 obviously can be distributed on the periphery. The bypass 13 can be controlled by a control valve 23 (FIG. 2) which conveniently has a temperature-dependent, control element, such as a bimetal or a memorious metal which, with increasing temperature of the oil or of the temperature of contiguous structural parts, opens the bypass 13. Instead of the control valve 23, a similarly acting aperture 24 (FIG. 3) can be provided. Temperature-dependent restrictors shaped as nozzles are also adequate for control of the coolant current. The control elements act passively, i.e. they do not have to be connected with an external control device. In order that they react quickly, it is convenient that they be situated as close as possible to the place in which the heat generates, specifically in the proximity of the friction lining 11 of the friction surface 25.

REFERENCE NUMERALS 1 converter
2 impeller
3 turbine wheel
4 stator
5 free wheel
6 housing
7 input shaft
8 output shaft
9 pump housing
10 lock-up clutch
11 friction lining
12 piston
13 bypass
14 intake
15 return flow
16 oil sump
17 oil filter
18 pressure oil pump
19 motor
20 pressure-regulating valve
21 pipe
22 pipe
23 control valve
24 aperture
25 friction surface

What is claimed is:

1. An automatic controlled transmission comprising:
   an input shaft (7) connected to an output shaft (8) by a hydrodynamic converter (1) and a lock-up clutch (10);
   a coolant intake (14) providing a coolant flow to the hydrodynamic converter and the lock-up clutch (10) and a coolant return (15) discharging the coolant from the hydrodynamic converter and the lock-up clutch (10);
   a piston (12) connected with and actuating the lock-up clutch (10) according to a pressure differential occurring between the coolant flow intake (14) and the coolant return (15), the piston being traversed by the coolant flow, at a rate controlled by a temperature-dependent bypass control valve according to the temperature of the oil; and
   wherein the temperature-dependent bypass control valve (23) is radially positioned proximate friction surfaces (11, 25) of said lock-up clutch (10), to regulate the rate of coolant flow traversing the piston according to a temperature of the coolant flow,
      said temperature-dependent bypass control valve being responsive to the temperature of the oil to reduce the coolant flow to the frictional surfaces of the lock-up clutch when the frictional surfaces of the lock-up clutch are at normal operating temperature and
         to thereby increase the level of power that the lock-up clutch is capable of transferring through the friction surfaces and to the output shaft when the friction surfaces are at normal operating temperature.

2. The transmission according to claim 1, wherein said temperature-dependent bypass control valve (23) has a control element made of a memorious metal.

3. The transmission according to claim 1, wherein said temperature-dependent bypass control valve (23) has a control element made of a bimetal.

4. The transmission according to claim 1, wherein said temperature-dependent bypass control valve (13) is situated adjacent said friction surfaces (11, 25) of said lock-up clutch (10).

5. An automatic controlled transmission comprising:
   an input shaft (7) connected to an output shaft (8) by a hydrodynamic converter (1) and a lock-up clutch (10);
   a coolant intake (14) providing a coolant flow to the hydrodynamic converter and the lock-up clutch (10) and a coolant return (15) discharging the coolant from the hydrodynamic converter and the lock-up clutch (10);
   a piston (12) connected with and actuating the lock-up clutch (10) according to a pressure differential occurring between the coolant flow intake (14) and the coolant return (15), the piston being traversed by the coolant flow at a rate controlled according to the temperature of the coolant flow, and
   wherein a temperature-dependent bypass control valve is radially positioned proximate friction surfaces (11, 25) of said lock-up clutch (10) and the temperature-dependent bypass control valve has one of a temperature dependent aperture (24) and a temperature dependent nozzle regulating the coolant flow rate through the temperature-dependent bypass control valve, and wherein
      said temperature-dependent bypass control valve is responsive to the temperature of the oil to reduce the coolant flow to the frictional surfaces of the lock-up clutch when the frictional surfaces of the lock-up clutch are at normal operating temperature and
         to thereby increase the level of power that the lock-up clutch is capable of transferring through the friction surfaces and to the output shaft when the friction surfaces are at normal operating temperature.

6. The transmission according to claim 5, wherein said one of the temperature dependent aperture (24) and the temperature dependent nozzle of the temperature-dependent bypass control valve has a control element made of a memorious metal.

7. The transmission according to claim 5, wherein said one of the temperature dependent aperture (24) and the temperature dependent nozzle of the temperature-dependent bypass control valve has a control element made of a bimetal.

8. The transmission according to claim 5, wherein said temperature-dependent bypass control valve (13) is situated adjacent said friction surfaces (11, 25) of said lock-up clutch (10).

9. An automatic controlled transmission comprising:
   an input shaft (7) connected to an output shaft (8) by a hydrodynamic converter (1) and a lock-up clutch (10);
   a coolant intake (14) providing a coolant flow to the hydrodynamic converter and the lock-up clutch (10) and a coolant return (15) discharging the coolant from the hydrodynamic converter and the lock-up clutch (10);
   a piston (12) connected with and actuating the lock-up clutch (10) according to a pressure differential occurring between the coolant flow intake (14) and the coolant return (15), the piston being traversed by the coolant flow, at a rate controlled by a temperature-dependant bypass control valve according to the temperature of the oil, a friction lining (11) of said lock-up clutch (10) is supported by a surface located opposite the piston and located for engagement with the piston (12) during lock-up, and the temperature-dependent bypass control valve has one of a temperature dependent aperture (24) and a temperature dependent nozzle regulating the coolant flow rate through the bypass; and wherein the temperature-dependent bypass control valve is (23) radially positioned proximate friction surfaces (11, 25) of said lock-up clutch (10), to regulate the rate of coolant flow traversing the piston according to a temperature of the coolant flow, and wherein said temperature-dependent bypass control valve is responsive to the temperature of the oil to reduce the coolant flow to the frictional surfaces of the lock-up clutch when the frictional surfaces of the lock-up clutch are at normal operating temperature and to thereby increase the level of power that the lock-up clutch is capable of transferring through the friction surfaces and to the output shaft when the friction surfaces are at normal operating temperature.

10. The transmission according to claim 9, wherein said one of the temperature dependent aperture (24) and the temperature dependent nozzle of the temperature-dependent bypass control valve has a control element made of a memorious metal.

11. The transmission according to claim 9, wherein said one of the temperature dependent aperture (24) and the temperature dependent nozzle of the temperature-dependent bypass control valve has a control element made of a bimetal.

* * * * *